United States Patent [19]
Winkel

[11] Patent Number: 5,944,008
[45] Date of Patent: Aug. 31, 1999

[54] VERTICALLY AND HORIZONTALLY ADJUSTABLE COOKING APPARATUS

[76] Inventor: David M. Winkel, 6642 N. Chandler Rd., Elsie, Mich. 48831

[21] Appl. No.: 09/058,594

[22] Filed: Apr. 10, 1998

[51] Int. Cl.⁶ .............................. A47J 37/00; F24B 3/00; F24C 3/00
[52] U.S. Cl. ............... 126/25 R; 126/25 A; 126/25 AA; 126/29; 126/30
[58] Field of Search .............................. 126/25 A, 25 AA, 126/29, 30, 9 R, 506, 25 R

[56] References Cited

U.S. PATENT DOCUMENTS

| | | |
|---|---|---|
| 366,833 | 7/1887 | Hipwell . |
| 955,140 | 4/1910 | Cronk . |
| 1,311,302 | 7/1919 | Turner et al. .............................. 126/30 |
| 1,824,165 | 9/1931 | Miller . |
| 2,466,496 | 4/1949 | Smith . |
| 2,531,925 | 11/1950 | Taylor et al. .......................... 126/25 A |
| 2,751,899 | 6/1956 | Hamilton .............................. 126/25 A |
| 3,111,123 | 11/1963 | Fort ........................................ 126/137 |
| 4,024,851 | 5/1977 | Boda . |
| 4,083,354 | 4/1978 | Claire et al. .............................. 126/30 |
| 4,120,280 | 10/1978 | Iverson et al. . |
| 4,146,010 | 3/1979 | Manska . |
| 4,553,525 | 11/1985 | Ruble ........................................ 126/30 |
| 4,622,945 | 11/1986 | Glitten .................................. 126/25 A |
| 4,732,138 | 3/1988 | Vos . |
| 4,766,879 | 8/1988 | Freese ..................................... 126/137 |
| 4,856,423 | 8/1989 | Burns ..................................... 99/421 H |
| 4,911,146 | 3/1990 | Pushee . |
| 5,025,715 | 6/1991 | Sir . |

FOREIGN PATENT DOCUMENTS 961725  1/1975  Canada .................................. 126/104

Primary Examiner—Ira S. Lazarus
Assistant Examiner—Donna Mann
Attorney, Agent, or Firm—Mary M. Moyne; Ian C. McLeod

[57] ABSTRACT

An outdoor cooking apparatus (10) for use over an open fire pit. The cooking apparatus has three legs (12, 14 and 16 or 216) mounted together by a connector plate (18) in a tripod shape. The third leg of the apparatus includes a top portion (16A), a middle portion (16B) and a bottom portion (16C or 216C). The top and bottom portions extend downward at an angle and are connected by the horizontal middle portion. The middle portion extends horizontally away from the first and second legs such that the bottom portion of the third leg is spaced farther apart from the first and second leg than the top portion of the leg. A screw mechanism (36 or 236) is mounted on the bottom portion of the third leg to move the cooking surface (56) vertically. The cooking surface is mounted by a telescoping arm (58 or 258) to the sleeve (38 or 238) of the screw mechanism. The telescoping arm can be extended or retracted to horizontally move the cooking surface. The arm is attached to a pivoting sleeve (60) which is pivotably attached to the sleeve of the screw mechanism. The pivoting connector allows the cooking surface to be pivoted into and out of the fire without varying the horizontal or vertical adjustment of the cooking surface.

28 Claims, 4 Drawing Sheets

VERTICALLY AND HORIZONTALLY ADJUSTABLE COOKING APPARATUS

BACKGROUND OF THE INVENTION (1) Field of the Invention

The present invention relates to an outdoor cooking apparatus which allows for horizontally and vertically adjusting the cooking surface to position the cooking surface over an open fire pit. In particular, the present invention relates to a collapsible outdoor cooking apparatus which uses a screw assembly along one leg of the apparatus to vertically move the cooking surface toward and away from the open fire pit and which has a telescoping arm to horizontally position the cooking surface over the fire in the open fire pit.

(2) Description of the Related Art

The related art has shown various types of outdoor tripod cooking apparatuses or grills. Illustrative are U.S. Pat. Nos. 366,833 to Hipwell; 955,140 to Cronk; 1,824,165 to Miller; 2,466,496 to Smith; 4,024,851 to Boda; 4,120,280 to Iverson et al; 4,146,010 to Manska; 4,732,318 to Vos and 5,025,715 to Sir. Hipwell shows a tripod grill with the cooking surface suspended from the apex of the legs by three (3) chains. No means of adjusting the chains is described. Cronk shows a tripod grill with sleeves provided on all the legs of the grill which slide up and down the legs to allow for vertically adjusting the top portion of the grill. Miller shows a collapsible tripod grill. The cooking surface is neither horizontally nor vertically adjustable. Smith shows a tripod grill having the cooking utensil connected by a chain which allows for vertically adjusting the height of the cooking utensil by securing the chain using different links. No means of horizontally adjusting the cooking utensil is described.

Boda and Iverson et al both show tripod cooking grills where the grill assembly is supported by cables which merge into a single cable which extends down from the apex of the cooking grills. The height of the grill assembly is adjusted by moving a locking means at the opposite end of the cable up and down one of the legs of the cooking grills.

Manska shows a tripod grill with the cooking vessel supported by chains secured to all three legs. The chains having locks which slidably move along the legs to allow vertical adjustment of the cooking vessel. The locks are secured in position by frictional engagement with the legs. Vos shows a tripod campfire cooking assembly having a top cooking grill attached by a cable to the apex of the assembly. The top grill is raised and lowered by moving a locking bracket up and down one of the legs of the assembly. A lower grill is connected by three cables having three separate locking brackets which are adjustable along each of the legs of the assembly for vertically moving the lower grill. Sir shows a tripod cooking stand where the grill is supported from the apex of the stand by a chain or a solid shaft. Adjusting the height of the grill is accomplished by securing the chain using different lengths or locking the shaft in place at different points along the shaft.

Only of minimal interest is U.S. Pat. No. 4,911,146 to Pushee which shows a fireplace cooking device which allows for raising and lowering a grill attached to the device.

None of the above patents show a tripod grill where the cooking surface is both horizontally and vertically adjustable. Further, none of the above patents show the use of a screw mechanism to easily and accurately raise and lower the cooking surface over the open fire pit. There remains the need for a collapsible outdoor grill which allows for separate horizontal and vertical adjustment of the cooking surface.

OBJECTS

It is therefore an object of the present invention to provide an outdoor cooking apparatus which is collapsible and which allows for horizontal and vertical adjustment of the cooking surface to position the cooking surface over the open fire pit. Further, it is an object of the present invention to provide an outdoor cooking apparatus having a tripod shape with the cooking surface movably attached to only one of the legs. Still further, it is an object of the present invention to provide an outdoor cooking apparatus with controlled raising and lowering of the cooking surface by using a screw assembly. Further still, it is an object of the present invention to provide a method for cooking using an outdoor cooking apparatus which allows for varying the position of the cooking surface both horizontally and vertically. Further, it is an object of the present invention to provide a method for cooking outdoors which uses a collapsible tripod cooking assembly and which allows for moving the cooking surface toward and away from the fire without making contact with the fire.

These and other objects will become increasingly apparent by reference to the following drawings and the description.

DETAILED DESCRIPTION OF THE PREFERRED EMBODIMENTS

Figure 1:
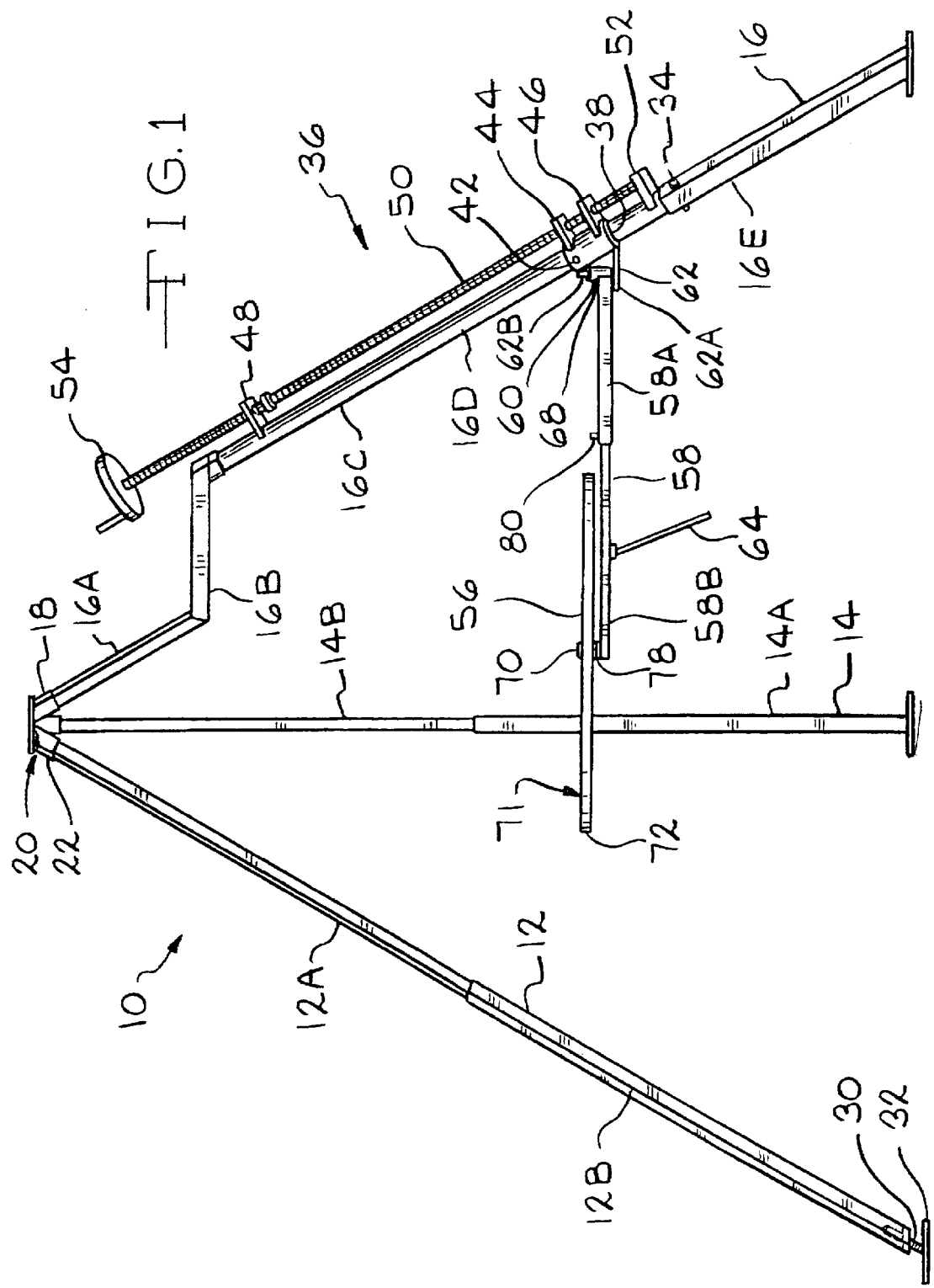
FIG. 1 is a side view of the apparatus 10 of the first embodiment showing the screw mechanism 36.

The present invention relates to a cooking apparatus for use over an open fire pit, which comprises: three legs having opposed ends and connected together at one end such as to extend outward at an angle away from each other; a movement means mounted on only one of the legs for moving up and down along the leg; and a cooking surface connected to the movement means such as to extend inward over the fire pit, wherein as the movement means moves along the leg, the cooking surface moves toward and away from the fire pit in a vertical direction.

Further, the present invention relates to a cooking apparatus for use over an open fire pit, which comprises: a first, second and third leg having first and second ends and connected together at the first end at a point on a vertical axis of the apparatus so that the legs extend outward away from each other at an angle, the third leg having a first portion and a second portion with a horizontal middle portion extending therebetween with the first portion extending between the first end and the middle portion and the second portion extending between the middle portion and the second end wherein the first and second portions of the third leg extend at an angle to the vertical axis of the apparatus similar to the angle to the vertical axis of the apparatus of the first and second legs; and a cooking surface mounted on one of the legs.

Still further, the present invention relates to a cooking apparatus for use over an open fire pit, which comprises: first, second and third legs each having first and second ends and connected together at the first end so that the legs extend outward at an angle away from each other from a point on a vertical axis of the apparatus, the third leg having a first, second and third portion between the ends wherein the first portion of the third leg is adjacent the first end and extends downward at an angle away from the first and second legs, wherein the second portion is spaced between the first and third portions and extends essentially horizontally in a direction away from the first and second legs and wherein the third portion is adjacent the second end of the third leg and extends downward from the second portion at an angle away from the first and second legs; and a movable cooking means mounted on the third portion of the third leg and having a cooking surface extending inward toward the first and second legs, the movable cooking means being movable along the third leg for moving the cooking surface toward and away from the open fire pit.

Further still, the present invention relates to a method for cooking food over an open fire pit, which comprises the steps of: providing a cooking apparatus having first, second and third legs each having first and second ends and connected together at the first end so that the legs extend outward at an angle away from each other from a point on a vertical axis of the apparatus, the third leg having a first, second and third portion between the ends wherein the first portion of the third leg is adjacent the first end and extends downward at an angle away from the first and second legs, wherein the second portion is spaced between the first and third portions and extends essentially horizontally in a direction away from the first and second legs and wherein the third portion is adjacent the second end of the third leg and extends downward from the second portion at an angle away from the first and second legs; and a movable cooking means mounted on the third portion of the third leg and having a cooking surface extending inward toward the first and second legs, the movable cooking means being movable along the third leg for moving the cooking surface toward and away from the open fire pit; positioning the cooking apparatus so that the open fire pit is surrounded by the legs of the apparatus; placing the food on the cooking surface of the cooking apparatus; moving the cooking means so as to position the cooking surface between the legs of the cooking apparatus over the open fire pit; and moving the cooking means to adjust a vertical height of the cooking surface over the open fire pit.

The invention is a cooking apparatus 10 having a screw assembly 36 or 236 which allows for vertical adjustment of the cooking surface 56 over the fire (not shown). A handle 54 at one end of the screw assembly 36 or 236 allows the cooking surface 56 to be raised and lowered while allowing the user to remain a safe distance from the fire. The cooking apparatus 10 also has a horizontally adjustable arm 58 or 258 which allows for horizontally positioning the cooking surface 56 over the fire. A handle is provided on the adjustable arm 58 to allow the user to horizontally move the cooking surface 56 while remaining a safe distance from the fire. The arm 58 or 258 is also pivotably connected to the sliding sleeve 38 or 238 of the screw assembly 36 or 236 of the cooking apparatus 10 to allow the arm 58 or 258 and cooking surface 56 to be moved in an arc about the leg 16 to move the cooking surface 56 into and out of the area of the open fire pit.

Figure 3:
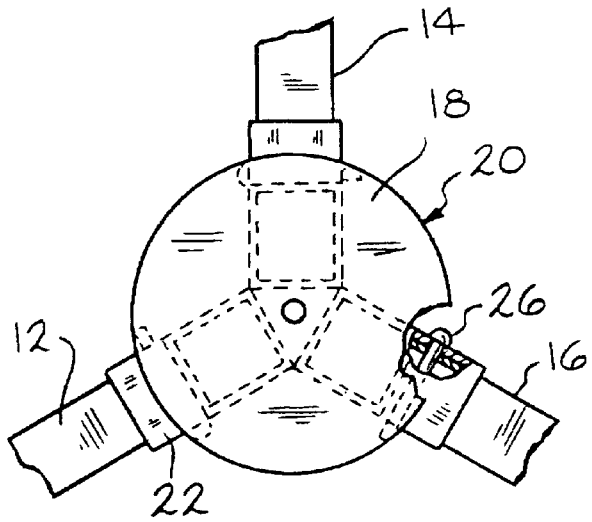
FIG. 3 is a partial top view showing the legs 12, 14 and 16 mounted in the sleeves 22 of the connector plate 18 with a cutaway showing the connector pin 26.
Figure 4:
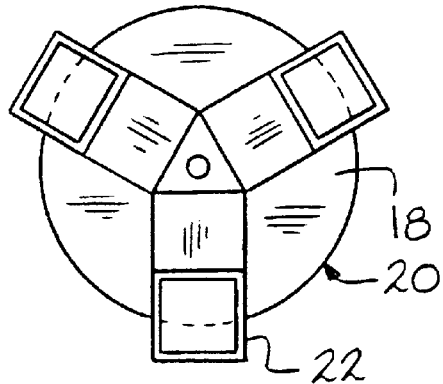
FIG. 4 is a partial bottom view showing the sleeves 22 of the connector plate 18.
Figure 5:
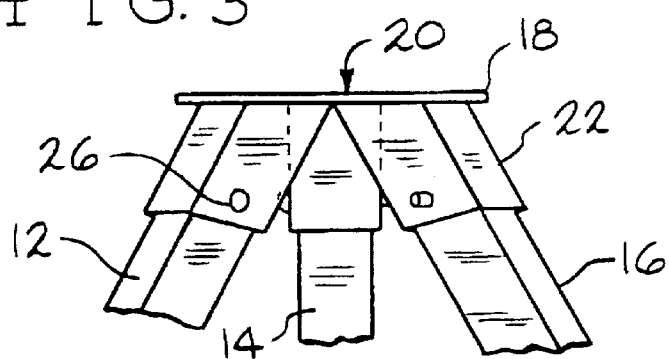
FIG. 5 is a partial side view of the top of the legs 12, 14 and 16 in the sleeves 22 of the connector plate 18.

FIG. 1 shows the cooking apparatus 10 of the present invention. The cooking apparatus 10 has a tripod shape with three (3) legs 12, 14 and 16 or 216 connected together by a connector plate 18 at the apex of the cooking apparatus 10 (FIGS. 3 to 7). The legs 12, 14 and 16 or 216 preferably have a square cross-section and are constructed of hollow tubular metal. However, the legs 12, 14 and 16 or 216 can have any cross-section such as circular and can also be constructed of any material which is durable and can withstand the heat of the fire. The connector plate 18 preferably includes a top circular plate 20 with three connector sleeves 22 mounted on the bottom side of the plate 18. The connector sleeves 22 are preferably all identical and are mounted on the circular top plate 20 such as to be spaced an equal distance apart (FIGS. 3 and 4). The sleeves 22 have a cross-section similar to the cross-section of the legs 12, 14 and 16 or 216 but have a larger size such that the ends of the legs 12, 14 and 16 or 216 easily slide into the sleeves 22. The end of the sleeves 22 which are mounted to the top plate 20 are angled such that when the sleeves 22 are mounted on the plate 20, the sleeves 22 extend downward at an angle away from the center of the top plate 20 (FIG. 5). The sleeves 22 preferably all have the same angle such that the legs 12, 14 and 16 or 216 extend outward away from the apex of the cooking apparatus 10 at the same angle. The sleeves 22 preferably extend outward at an angle of 26°. The sleeves 22 have a length of about 2.50 inches (6.35 cm) and are provided with holes (not shown) extending through two parallel sides at the end of the sleeves 22 opposite the top plate 20. The holes in the sleeves 22 correspond with holes (not shown) in the top of the legs 12, 14 and 16 or 216 and allow mounting pins 26 to be inserted through the holes in the sleeves 22 and in the legs 12, 14 and 16 or 216 to secure the legs 12, 14 and 16 or 216 in the sleeves 22. In the preferred embodiment, the legs 12, 14 and 16 or 216 extend into the sleeves 22 about 2.5 inches (6.4 cm). The pins 26 used to secure the legs 12, 14 and 16 or 216 are preferably similar to a quick release pin. However, bolts and nuts or any other well known fastener can be used in place of the pins 26.

Figure 6:
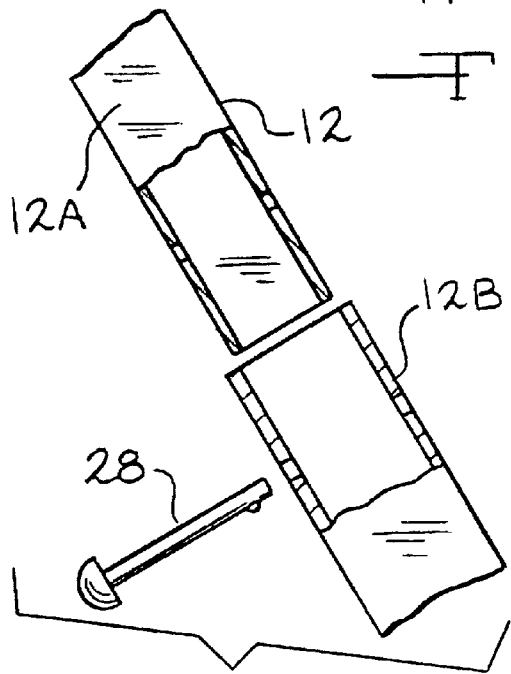
FIG. 6 is a partial view of the first leg 12 with a cutaway cross-section showing the top portion 12A of the leg 12 disconnected from the bottom portion 12B of the leg 12 and the connector pin 28.
Figure 7:
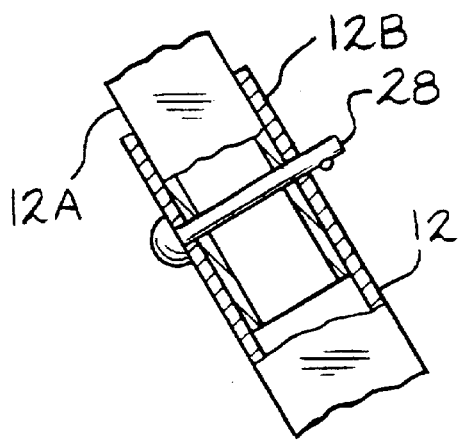
FIG. 7 is a partial view of the first leg 12 with a cutaway cross-section showing the top portion 12A of the leg 12 connected to the bottom portion 12B of the leg 12 by the connector pin 28.

The first and second legs 12 and 14 of the cooking apparatus 10 are preferably similar. The legs 12 and 14 are preferably constructed of a top portion 12A and 14A and a bottom portion 12B and 14B which are telescopingly mounted together (FIG. 1). The bottom end of the top portion 12A or 14A is inserted into the top end of the bottom portion 12B or 14B. In an alternate embodiment (not shown) the top end of the bottom portion 12B or 14B is inserted into the bottom end of the top portion 12A or 14A. A pin 28 is used to secure the portions 12A and 14A and 12B and 14B of the legs 12 and 14 together (FIGS. 6 and 7). The pins 28 are preferably similar to the pins 26 used to secure the legs 12 and 14 in the connector plate 18. One or both of the legs 12 and 14 can be provided with a height adjustment screw 30 (one shown) adjacent the bottom end of the bottom portion 12B or 14B to allow for leveling the cooking apparatus 10 when mounted on an uneven ground surface (not shown) (FIG. 1). The bottom ends 12B and 14B of the legs 12 and 14 are preferably provided with foot pads 32 which allow for more steady positioning of the cooking apparatus 10. The bottom ends 12B and 14B of the legs 12 and 14 are preferably angled similar to the top end 12A and 14A of the legs 12 and 14 but in the opposite direction such that the entire bottom surface of the leg 12 or 14 contacts the foot pad 32.

Figure 8:
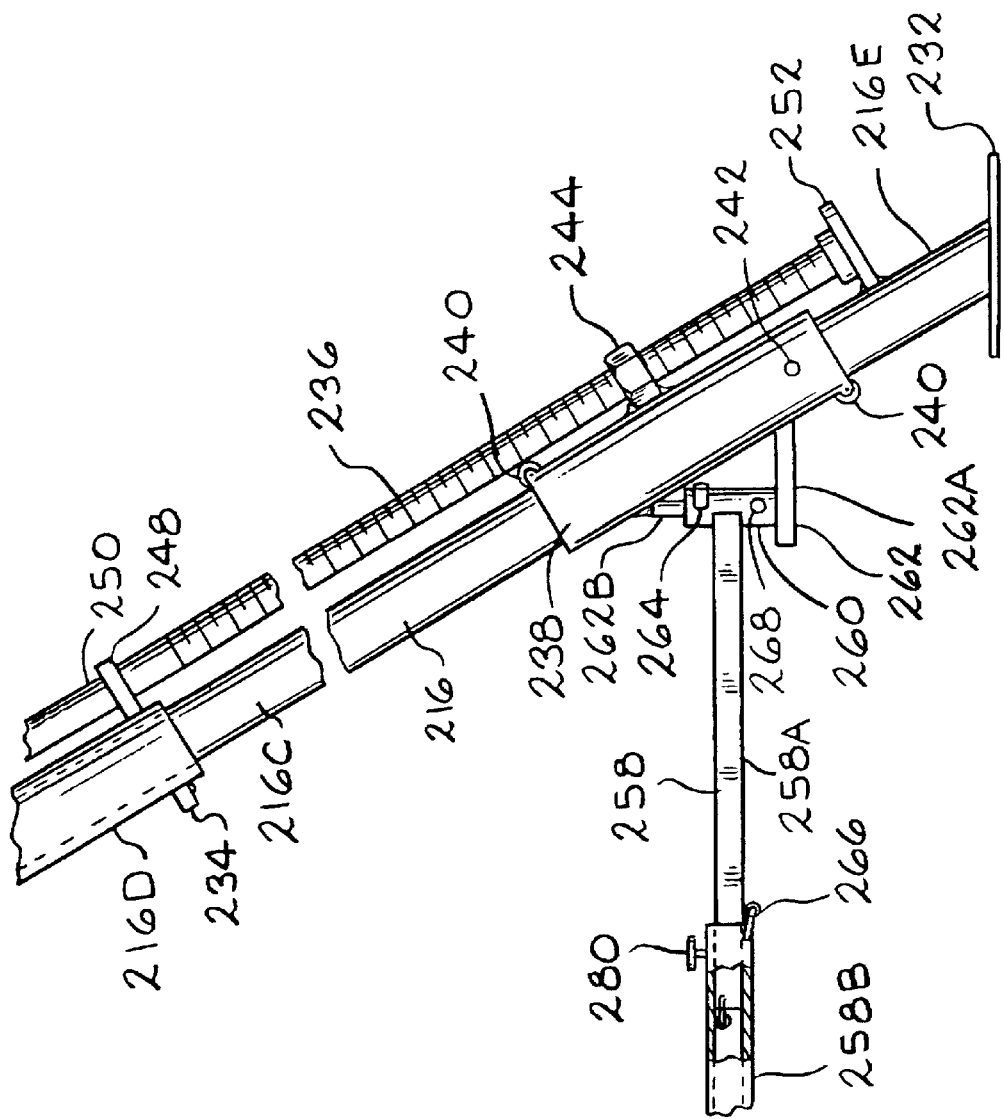
FIG. 8 is a partial view of the screw mechanism 236 of the second embodiment showing the horizontal arm 258 pivotably connected to the sliding sleeve 238.

The third leg 16 or 216 of the apparatus 10 preferably includes a top portion 16A, a middle portion 16B and a bottom portion 16C or 216C. The top portion 16A is preferably connected at one end to one of the sleeves 22 of the connector plate 18. The top portion 16A extends outward and downward from the connector plate 18 at the same angle as the first and second legs 12 and 14. The other end of the top portion 16A is connected to one end of the middle portion 16B. The middle portion 16B preferably extends horizontally outward from the top portion 16A away from the first and second legs 12 and 14. The other end of the middle portion 16B is connected to one end of the bottom portion 16C or 216C. The bottom portion 16C or 216C extends outward and downward from the middle portion 16B preferably at an angle similar to the top portion 16A of the leg 16. The bottom end of the bottom portion 16C or 216C of the third leg 16 or 216 is preferably angled and provided with a foot pad 32 similar to the first and second legs 12 and 14. The shape of the third leg 16 or 216 with the horizontal middle portion 16B increases the area beneath the legs 12, 14 and 16 or 216 of the apparatus 10. Further, the shape of the leg 16 or 216 enables the screw mechanism 36 or 236 to be spaced farther from the fire pit to allow the user to rotate the screw mechanism 36 or 236 without coming close to the fire. The bottom portion 16C or 216C of the third leg 16 or 216 is preferably constructed of a top section 16D or 216D which is connected to the middle portion 16B of the leg 16 or 216 and a bottom section 16E or 216E. The sections 16D, 216D and 16E, 216E are preferably secured together using a securing pin 34 or 234. In the first embodiment, the bottom section 16E is shorter such that the entire vertical screw mechanism 36 including the stopper plate 52 is located in the top section 16D of the bottom portion 16C of the third leg 16 (FIG. 1). In the second embodiment, the top section 216D is shorter than the bottom section 216E such that the head of the securing pin 234 which is used to secure the top and bottom sections 216D and 216E, acts as the guide bracket 248 for the threaded rod 50 for the vertical screw mechanism 236 (FIG. 8). The ability to disassemble the bottom portion 16C or 216C of the third leg 16 or 216 into two sections 16D, 216D and 16E, 216E allows for easier storage of the apparatus 10.

The first and second leg 12 and 14 preferably have a length of 48.0 inches (121.9 cm) when connected together, including the portion located in the connector sleeve 22. In the preferred embodiment, the top portion 16A of the third leg 16 or 216 has a length of 12.0 inches (30.5 cm) including the portion located in the sleeve 22, the middle portion 16B has a length of 5.0 inches (12.7 cm) and the bottom portion 16C or 216C has a length of 35.0 inches (88.9 cm). The cooking apparatus 10 has an approximate height of 44.0 inch (111.8 cm) from the ground surface to the top of the connector plate 18.

The bottom portion 16C or 216C of the third leg 16 or 216 is provided with a vertical screw mechanism 36 or 236 for raising and lowering the cooking surface 56 away from and toward the open fire pit. The screw mechanism 36 or 236 includes a sliding sleeve 38 or 238, brackets 44 or 46 and 244 and a threaded rod 50. The sliding sleeve 38 or 238 is slidably mounted over the bottom portion 16C or 216C of the third leg 16. The sliding sleeve 38 or 238 preferably has the same cross-sectional shape as the leg 16 or 216 but is larger such that the sleeve 38 or 238 will freely move up and down the leg 16 or 216. In the first embodiment (FIG. 1), the sleeve 38 preferably does not travel below the intersection of the telescoping sections 16D and 16E. Preferably, the sleeve 38 or 238 is provided with rollers 240 (shown on second embodiment only) at each end and on opposite sides of the sleeve 38 or 238 adjacent the leg 16 (FIG. 8). The rollers 240 allow for easier movement of the sleeve 38 or 238 along the leg 16 or 216; particularly, when weight on the cooking surface 56 causes the sleeve 38 or 238 to pivot or cam against the leg 16 or 216. The sleeve 38 or 238 is also provided with a locking mechanism for securing the sleeve 38 or 238 in a set position on the leg 16 or 216. The locking mechanism can be a set screw 42 inserted through the sleeve 38 or 238 and into contact with the leg 16 or 216 (FIG. 8). The sleeve 38 or 238 and leg 16 or 216 can be provided with a detent mechanism (not shown) as the locking mechanism to keep the sleeve 38 or 238 in a predetermined position.

In the first embodiment, the screw mechanism 36 has upper and lower brackets 44 and 46 mounted at the upper and lower ends respectively, of the sliding sleeve 38 (FIG. 1). The brackets 44 and 46 are preferably mounted on the outside of the sleeve 38 on the side opposite the fire pit. Both brackets 44 and 46 preferably have threaded apertures (not shown) which threadably mate with the threads of the threaded rod 50. However, one of the brackets 44 or 46 could have an unthreaded aperture which merely acts to guide the threaded rod 50 and hold the threaded rod 50 in place. In the second embodiment, a single threaded bracket 244 is mounted between the ends of the sleeve 238 on the side opposite the fire pit. The threaded bracket 244 has an aperture (not shown) having threads which threadably mate with the threads of the threaded rod 50.

A guide bracket 48 or 248 is preferably mounted above the sleeve 38 or 238 on the bottom portion 16C or 216C of the third leg 16 or 216 toward the middle portion 16B. The guide bracket 48 or 248 preferably has a non-threaded aperture (not shown) through which the threaded rod 50 extends. The diameter of the aperture of the guide bracket 48 or 248 is preferably slightly greater than the diameter of the threaded rod 50 such as to allow the rod 50 to freely rotate within the guide bracket 48 or 248 without excessive side-to-side and front to back movement of the threaded rod 50. In the second embodiment, the guide bracket 248 is preferably the head of the securing pin 234 for the bottom portion 216C of the third leg 216.

The threaded rod 50 preferably extends through the guide bracket 48 or 248, through the threaded bracket or brackets 44 and 46 or 244 and rotatably rests on a stopper plate 52 or 252 at the lower end of the leg 16 or 216. The stopper plate 52 or 252 is preferably mounted on the leg 16 or 216 perpendicular to the leg 16 or 216 and has an indentation in the top surface into which the lower end of the threaded rod 50 is rotatably positioned. The upper end of the threaded rod 50 is provided with a handle 54 (one shown) which can be removed when not in use (FIG. 1). Removal of the handle 54 prevents the handle 54 from getting hot during use of the cooking apparatus 10. The threaded rod 50 preferably extends the entire length of the bottom portion 16C or 216C of the third leg 16 or 216. However, in the first embodiment with the bottom portion 16C or 216C of the leg 16 constructed as two telescopingly, adjustable sections 16D and 16E, the threaded rod 50 preferably does not extend down below the intersection of the telescoping pieces 16D and 16E (FIG. 1). The length of the rod 50 is such that the handle 54 at the upper end is above the bottom portion 16C or 216C of the third leg 16 or 216 and is adjacent the middle portion 16B of the third leg 16 or 216. The entire length of the threaded rod 50 is preferably threaded such as to provide maximum distance of travel for the sleeve 38 or 238 and consequently, the cooking surface 56. However, the top portion of the threaded rod 50 may be unthreaded to allow smoother rotation of the rod 50 in the guide bracket 48 or 248. The length of the threads on the threaded rod 50 may also be chosen to purposely limit the top travel length of the sleeve 38 or 238 such as when the cooking surface 56 would no longer fit between the legs 12, 14 and 16 or 216 of the apparatus 10. In the preferred embodiment, the threaded rod 50 has a diameter of 0.75 inches (1.91 cm) with six (6) threads per inch.

The cooking surface 56 is pivotably mounted by an arm 58 or 258 to the sliding sleeve 38 or 238 of the screw mechanism 36 or 236. The arm 58 or 258 is mounted to a pivoting sleeve 60 which is pivotably mounted on a bracket 62 extending outward from the sliding sleeve 38 or 238. The bracket 62 includes a horizontal base section 62A and a vertical connector section 62B. The horizontal base section 62A is essentially parallel to the ground surface and the vertical connector section 62B is essentially parallel to the vertical axis A—A of the apparatus 10 extending through the apex of the apparatus 10. The base section 62A is mounted on the sliding sleeve 38 or 238 of the screw mechanism 36 or 236 on the side adjacent the first and second legs 12 and 14 of the apparatus 10. The base section 62A extends inward toward the center of the apparatus 10. The connector section 62B is connected at one end to the pivoting sleeve 60 on the side adjacent the first and second legs 12 and 14 and extends downward and is connected at the other end to the base section 62A. The connector section 62B is preferably a cylinder rod. The pivoting sleeve 60 is pivotably mounted on the connector section 62B or 262B of the bracket 62. The sleeve 60 or 260 has a cross-section similar to the cross-section of the connector section 62B but is larger in size such as to allow the sleeve 60 to freely pivot on the connector section 62B. The sleeve 60 has stops 264 (shown in second embodiment) on opposite sides of the sleeve 60 which limit the rotation of the sleeve 60 around the connector section 62B (FIG. 8). The stops 264 are preferably studs which extend outward from the pivoting sleeve 60 and which contact the sliding sleeve 38 or 238 of the screw mechanism 36 or 236 to stop the rotation of the pivoting sleeve 60 on the connector section 62B of the bracket 62. Preferably, the top of the pivoting sleeve 60 contacts the sliding sleeve 38 or 238 and prevents extraneous, vertical motion of the pivoting sleeve 60 and the cooking surface 56 (FIG. 8). The pivoting sleeve 60 is preferably provided with a locking mechanism such as a set screw 68.

The arm 58 or 258 is preferably constructed of a first half 58A or 258A and a second half 58B or 258B telescopingly connected together. The first and second halves 58A, 58B or 258A, 258B preferably have a square cross-section; however, the halves 58A, 58B or 258A, 258B can have a variety of cross-sections. The first half 58A or 258A is connected at one end to the pivoting sleeve 60. In the first embodiment, the second half 58B or 258B can be mounted within the other end of the first half 58A or 258A (FIG. 1). By contrast in the second embodiment, the first half 258A is received within one end of the second half 258B opposite the grill surface (not shown in FIG. 8). In both embodiments, rollers 266 (one pair shown) are provided between the halves 58A, 58B or 258A, 258B (FIG. 8). The rollers 266 act to increase the ease with which the arm 58 or 258 is extended and retracted particularly when a weight is placed on the cooking surface 56 which causes the second half 58B or 258B of the arm 58 or 258 to pivot causing the first and second halves 58A, 58B or 258A, 258B to cam against each other. The end of the first half 58A or 258A opposite the pivoting sleeve 60 is provided with a roller 266 adjacent the top wall of the first half 58A or 258A which contacts the inner top wall of the second half 58B or 258B. The end of the second half 58B or 258B adjacent the first half 58A or 258A is preferably also provided with a roller 266 adjacent the bottom wall which contacts the bottom wall of the first half 58A or 258A. A connecting chain (not shown) can be provided between the first and second half 258A and 258B of the arm 258 to prevent the second half 258B of the arm 258 from coming apart from the first half 258A.

A horizontal movement mechanism is connected to the arm 58 or 258 and allows for controlled extension and retraction of the arm 58 or 258. The horizontal movement mechanism can be a handle 64 connected to the second half 58B of the arm 58 (FIG. 1). Alternatively, the horizontal movement mechanism includes a threaded bracket, a threaded rod (not shown) and a guide bracket. The threaded bracket is preferably mounted on a side of the second half 58B or 258B of the arm 58 or 258. The guide bracket is preferably mounted on a side of the pivoting sleeve 60 corresponding to the side of the arm 58 or 258 having the threaded bracket. The threaded rod extends through the guide bracket and into the threaded bracket such that a handle on the end of the threaded rod adjacent the pivoting sleeve 60 does not interfere with the pivoting of the arm 58 or 258. The arm 58 or 258 is provided with a set screw 80 or other locking mechanism which holds the arm 58 or 258 in a desired position.

Figure 2:
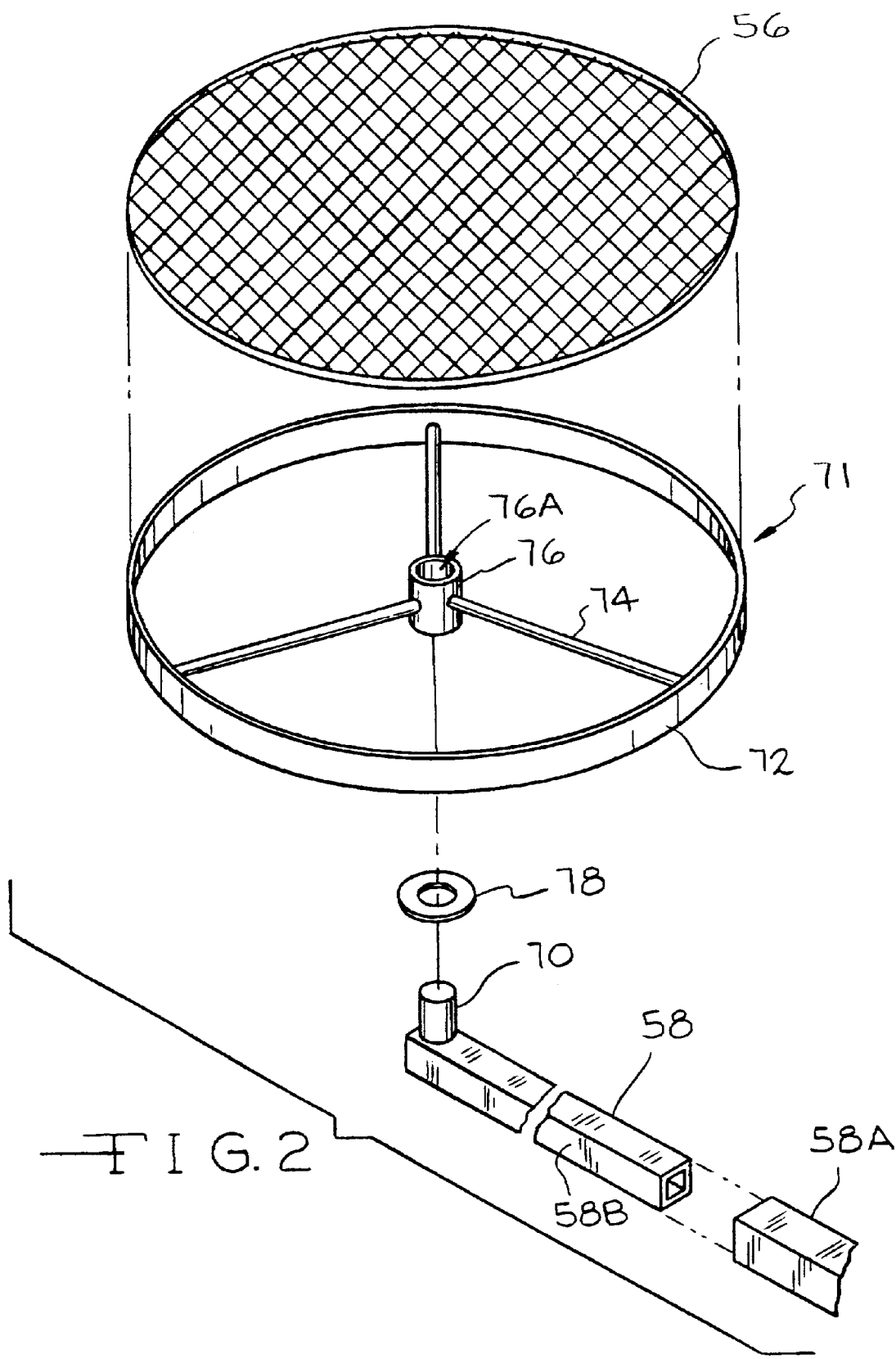
FIG. 2 is a partial view showing only the horizontal arm 58 with the cooking surface 56 and the support frame 71 in the disassembled position.

The end of the second half 58B or 258B of the arm 58 or 258 opposite the first half 58A or 258A is provided with a cylindrical mounting pin 70 upon which is rotatably mounted the cooking surface 56 and the support frame 71 (FIG. 2). The cooking surface 56 can have any shape such as circular or rectangular. The support frame 71 preferably includes an outer support frame 72 which follows the shape of the cooking surface 56. The outer support frame 72 is connected by spokes 74 to a center hub 76. The cooking surface 56 and support frame 71 are preferably permanently connected together as a unitary piece. The center hub 76 has a bore 76A which allows for rotatably mounting the cooking surface 56 and support frame 71 on the mounting pin 70 of the arm 58 or 258. A washer 78 is provided between the hub 76 and the arm 58 or 258 to provide for better rotation of the cooking surface 56. The cooking surface 56 can be constructed of any material well known for use as cooking surfaces. In the preferred embodiment, the cooking surface 56 is constructed of nickel plated steel.

IN USE

To use the cooking apparatus 10 of the present invention, the cooking apparatus 10 is first fully assembled. The ability to disassemble and collapse the cooking apparatus 10 allows for easier storage and transportation of the cooking apparatus 10. To assemble the cooking apparatus 10, the upper and lower portions 12A, 14A and 12B, 14B of the first and second legs 12 and 14 are secured together. Next, the tops of the first and second legs 12 and 14 are inserted into the sleeves 22 of the connector plate 18 and secured in place using the securing pins 26. The top end 16D of the third leg 16 or 216 is then secured into the remaining sleeve 22 of the connector plate 18 and the lower section 16E of the bottom portion 16C or 216C of the third leg 16 or 216 is secured to the upper section 16D or 216D of the bottom portion 16C or 216C of the third leg 16 or 216. The threaded rod 50 is then extended through the guide bracket 48 or 248 and the threaded brackets 44, 46 or 244. Finally, the cooking surface 56 is mounted on the end of the arm 58 or 258. The arm 58 or 258 preferably remains connected to the pivoting sleeve 60 which remains mounted on the bracket 62 on the sliding sleeve 38 or 238 which is left on the third leg 16 or 216 when disassembled. Once the apparatus 10 is fully assembled, the cooking apparatus 10 is positioned around the open fire pit such that the legs 12, 14 and 16 or 216 surround the open fire pit. Preferably, the vertical axis A—A of the apparatus 10 extends through essentially the center of the fire pit. The cooking apparatus 10 is positioned so that all three foot pads 32 are fully and securely on the ground surface. In the case of an uneven ground surface, the foot pads 32 can be used to dig grooves in the ground surface to level out the cooking apparatus 10. Alternatively, the length of one of the legs 12 or 14 of the cooking apparatus 10 can be adjusted to compensate for the uneven ground surface (FIG. 1). The cooking apparatus 10 can be positioned around the open fire pit before or after the fire has been started.

Once the cooking apparatus 10 is in position, the position of the cooking surface 56 is adjusted. The vertical screw mechanism 36 or 236 is used to raise and lower the cooking surface 56 vertically. To raise or lower the cooking surface 56, the handle 54 is placed on the end of the threaded rod 50 and the rod 50 is rotated. Since the rod 50 is stationary and unable to move vertically, rotation of the rod 50 in the threaded bracket 44 and 46 or 244 causes the sleeve 38 or 238 to move up or down the threaded rod 50 and the third leg 16 or 216 of the cooking apparatus 10. Once the cooking surface 56 is at the desired cooking height, the set screw 42 or other locking mechanism is used to secure the sleeve 38 or 238 in position on the third leg 16 or 216. The height of the cooking surface 56 is limited by the area between the legs 12, 14 and 16 or 216 of the cooking apparatus 10 and the size of the cooking surface 56. Alternatively, the height of the cooking surface 56 is limited to the height of the threads on the threaded rod 50. To position the cooking surface 56 horizontally, the user grabs hold of the handle 64 connected to the second half 58B or 258B of the arm 58 or 258 and moves the second half 58B or 258B along the first half 58A or 258A of the arm 58 or 258. Alternatively, the small threaded rod is inserted through the guide bracket and threaded into the threaded bracket. The handle 64 is then pulled or pushed to extend or retract the second half 58B or 258B of the arm 58 or 258. The threaded rod 50 can then be disengaged from the threaded bracket and removed. Once the cooking surface 56 is in the correct horizontal position, the set screw 80 or other locking mechanism is used to secure the arm 58 or 258 in place.

To load the food on the cooking surface 56, the arm 58 or 258 is pivoted outward such that the cooking surface 56 moves away from between the legs 12, 14 and 16 or 216 of the cooking apparatus 10 and away from the fire pit. Preferably, the cooking surface 56 can be pivoted in either direction depending upon the location of the user. The cooking surface 56 can also be rotated on the mounting pin 70 on the arm 58 or 258 to allow easier access to the entire cooking surface 56. Once the food is on the cooking surface 56, the cooking surface 56 is pivoted back between the legs 12, 14 and 16 or 216 of the cooking apparatus 10 such that the cooking surface 56 is over the open fire pit. The set screw 80 or other locking mechanism is used to secure the cooking surface 56 in position over the open fire pit. The cooking surface 56 can also be adjusted both vertically and horizontally during cooking. In addition, the cooking surface 56 can also be easily pivoted out from over the fire pit during cooking without altering the horizontal or vertical position of the cooking surface 56.

It is intended that the foregoing description be only descriptive of the present invention and that the present invention be limited only by the hereinafter appended claims.

I claim:

1. A cooking apparatus for use over an open fire pit, which comprises:

three legs having opposed ends and connected together at one end such as to extend outward at an angle away from each other toward the other end of the legs wherein the other end of the legs are configured to be positioned around the fire pit;

a movement means mounted on only one of the legs between the ends of the leg for moving up and down along the leg; and a cooking surface connected to the movement means such as to extend inward over the fire pit, wherein as the movement means moves along the leg, the cooking surface moves toward and away from the fire pit in a vertical direction.

2. The cooking apparatus of claim 1 wherein the movement means includes a sleeve slidably mounted on one of the legs.

3. The cooking apparatus of claim 2 wherein the movement means includes a threaded rod connected by a threaded bracket to the sleeve wherein the bracket and the sleeve move along the threaded rod and the leg as the rod is rotated.

4. The cooking apparatus of claim 1 wherein the cooking surface is connected by a horizontally extendible arm to the movement means.

5. A cooking apparatus for use over an open fire pit, which comprises:

(a) a first, second and third leg having first and second ends and connected together at the first end at a point on a vertical axis of the apparatus so that the legs extend outward away from each other at an angle toward the second end of the legs wherein the second end of the legs are configured to be positioned around the fire pit, the third leg having a first portion and a second portion with a horizontal middle portion extending therebetween with the first portion extending between the first end and the middle portion and the second portion extending between the middle portion and the second end wherein the first and second portions of the third leg extend at an angle to the vertical axis of the apparatus; and (b) a cooking means mounted on one of the legs between the first and second end of the leg.

6. The apparatus of claim 5 wherein the cooking means is vertically adjustable away from and toward the open pit.

7. The apparatus of claim 5 wherein the cooking means is horizontally adjustable away from and toward the open pit.

8. The apparatus of claim 5 wherein the cooking means is vertically and horizontally adjustable away from and toward the fire pit.

9. A cooking apparatus for use over an open fire pit, which comprises:

(a) first, second and third legs each having first and second ends and connected together at the first end so that the legs extend outward at an angle away from each other from a point on a vertical axis of the apparatus, the third leg having a first, second and third portion between the ends wherein the first portion of the third leg is adjacent the first end and extends downward at an angle away from the first and second legs, wherein the second portion is spaced between the first and third portions and extends essentially horizontally in a direction away from the first and second legs and wherein the third portion is adjacent the second end of the third leg and extends downward from the second portion at an angle away from the first and second legs; and (b) a movable cooking means mounted on the third portion of the third leg and having a cooking surface extending inward toward the first and second legs, the movable cooking means being movable along the third leg for moving the cooking surface toward and away from the open fire pit.

10. The cooking apparatus of claim 9 wherein the first ends of the legs are mounted in a connector such that the first ends of the legs are 120° apart.

11. The cooking apparatus of claim 9 wherein the movable cooking means includes a movable sleeve slidably mounted on the third portion of the third leg.

12. The cooking apparatus of claim 11 wherein the movable cooking means includes a threaded rod which is connected by a threaded bracket to the sleeve wherein the bracket and sleeve move along the threaded rod as the rod is rotated.

13. The cooking apparatus of claim 9 wherein the cooking surface is connected by an arm to the movable cooking means.

14. The cooking apparatus of claim 13 wherein the arm is pivotally connected to the movable cooking means.

15. The cooking apparatus of claim 14 wherein the arm is horizontally extendible so as to move the cooking surface toward and away from the first and second legs.

16. The cooking apparatus of claim 13 wherein the cooking surface is rotatably mounted to the arm.

17. The cooking apparatus of claim 14 wherein stops are provided on the movable cooking means to limit a degree of rotation of the arm and cooking surface.

18. The cooking apparatus of claim 11 wherein the sleeve is provided with rollers adjacent the third portion of the third leg to allow for easier movement of the sleeve along the third leg.

19. The cooking apparatus of claim 15 wherein the arm is constructed of a first section telescopingly mounted in a second section.

20. The cooking apparatus of claim 19 wherein a handle means is connected to the second section of the arm for extending or retracting the arm.

21. The cooking apparatus of claim 20 wherein the first section is provided with a first roller adjacent the second section and wherein the second section is provided with a second roller adjacent the first section to allow for easier extension and retraction of the arm.

22. The cooking apparatus of claim 9 wherein the legs have a square cross-section.

23. The cooking apparatus of claim 12 wherein the threaded rod has opposed ends and extends along the third portion of the third leg and has a handle at one end adjacent the second portion to allow for rotation of the threaded rod.

24. The cooking apparatus of claim 11 wherein a locking means is provided on the sleeve for locking the sleeve in position on the third leg.

25. A method for cooking food over an open fire pit, which comprises the steps of:

(a) providing a cooking apparatus having first, second and third legs each having first and second ends and connected together at the first end so that the legs extend outward at an angle away from each other from a point on a vertical axis of the apparatus, the third leg having a first, second and third portion between the ends wherein the first portion of the third leg is adjacent the first end and extends downward at an angle away from the first and second legs, wherein the second portion is spaced between the first and third portions and extends essentially horizontally in a direction away from the first and second legs and wherein the third portion is adjacent the second end of the third leg and extends downward from the second portion at an angle away from the first and second legs; and a movable cooking means mounted on the third portion of the third leg and having a cooking surface extending inward toward the first and second legs, the movable cooking means being movable along the third leg for moving the cooking surface toward and away from the open fire pit;

(b) positioning the cooking apparatus so that the open fire pit is surrounded by the legs of the apparatus;

(c) placing the food on the cooking surface of the cooking apparatus;

(d) moving the cooking means so as to position the cooking surface between the legs of the cooking apparatus over the open fire pit; and (e) moving the cooking means to adjust a vertical height of the cooking surface over the open fire pit.

26. The method of claim 25 wherein the cooking surface is connected to the cooking means by a horizontally adjustable arm and wherein the arm is adjusted to position the cooking surface toward or away from the third leg over the open fire pit.

27. The method of claim 25 wherein the cooking surface includes a sleeve member movably mounted on the third portion of the third leg and a threaded rod connected by a threaded bracket to the sleeve member and wherein in step (e) to move the cooking means to adjust the height of the cooking surface over the open fire pit, the threaded rod is rotated to move the bracket and sleeve member along the third portion of the third leg.

28. The method of claim 25 wherein a handle means is connected to the horizontally adjustable arm and wherein in step (d) to move the cooking means so as to position the cooking surface, the handle means is pulled or pushed which positions the cooking surface toward or away from the third leg over the open fire pit.

* * * * *